(12) United States Patent
Reason et al.

(10) Patent No.: US 6,321,549 B1
(45) Date of Patent: Nov. 27, 2001

(54) ELECTRONIC EXPANSION VALVE CONTROL SYSTEM

(75) Inventors: John Robert Reason, Liverpool, NY (US); Mead Robert Rusert, Athens, GA (US); Douglas Herbert Morse, Millis, MA (US); Thomas Edward Brendel, Cape Coral, FL (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/549,870

(22) Filed: Apr. 14, 2000

(51) Int. Cl.[7] .............................. F25B 41/04; B60H 1/32
(52) U.S. Cl. ................................. 62/223; 62/243
(58) Field of Search ......................... 62/223, 216, 217, 62/196, 278

(56) References Cited

U.S. PATENT DOCUMENTS

| | | | |
|---|---|---|---|
| 3,665,725 | * 5/1972 | Barlass et al. ............... | 62/196.4 |
| 5,253,483 | * 10/1993 | Powell et al. ............... | 62/181 |
| 5,255,529 | * 10/1993 | Powell et al. ............... | 62/180 |
| 5,257,508 | * 11/1993 | Powell et al. ............... | 62/180 |
| 5,271,238 | * 12/1993 | Powell et al. ............... | 62/228.4 |
| 5,396,779 | * 3/1995 | Voss ........................... | 62/196.2 |
| 6,094,930 | * 8/2000 | Zeng et al. .................. | 62/324.6 |
| 6,118,099 | * 9/2000 | Lake et al. .................. | 219/202 |
| 6,138,466 | * 10/2000 | Lakle et al. ................. | 62/199 |
| 6,148,628 | * 11/2000 | Reason et al. ............... | 62/223 |

* cited by examiner

Primary Examiner—Teresa Walberg
Assistant Examiner—Daniel Robinson
(74) Attorney, Agent, or Firm—Timothy J. Haller; Niro, Scavone, Haller & Niro

(57) ABSTRACT

A process and method for monitoring and selectively controlling the capacity and operating conditions of a refrigeration unit is disclosed. Specifically, the present invention includes the adjustment of the electronic expansion valve, and the compressor cylinder banks through the adjustment of desired superheat levels in order to bring a transport refrigeration unit within desired operating conditions.

9 Claims, 5 Drawing Sheets

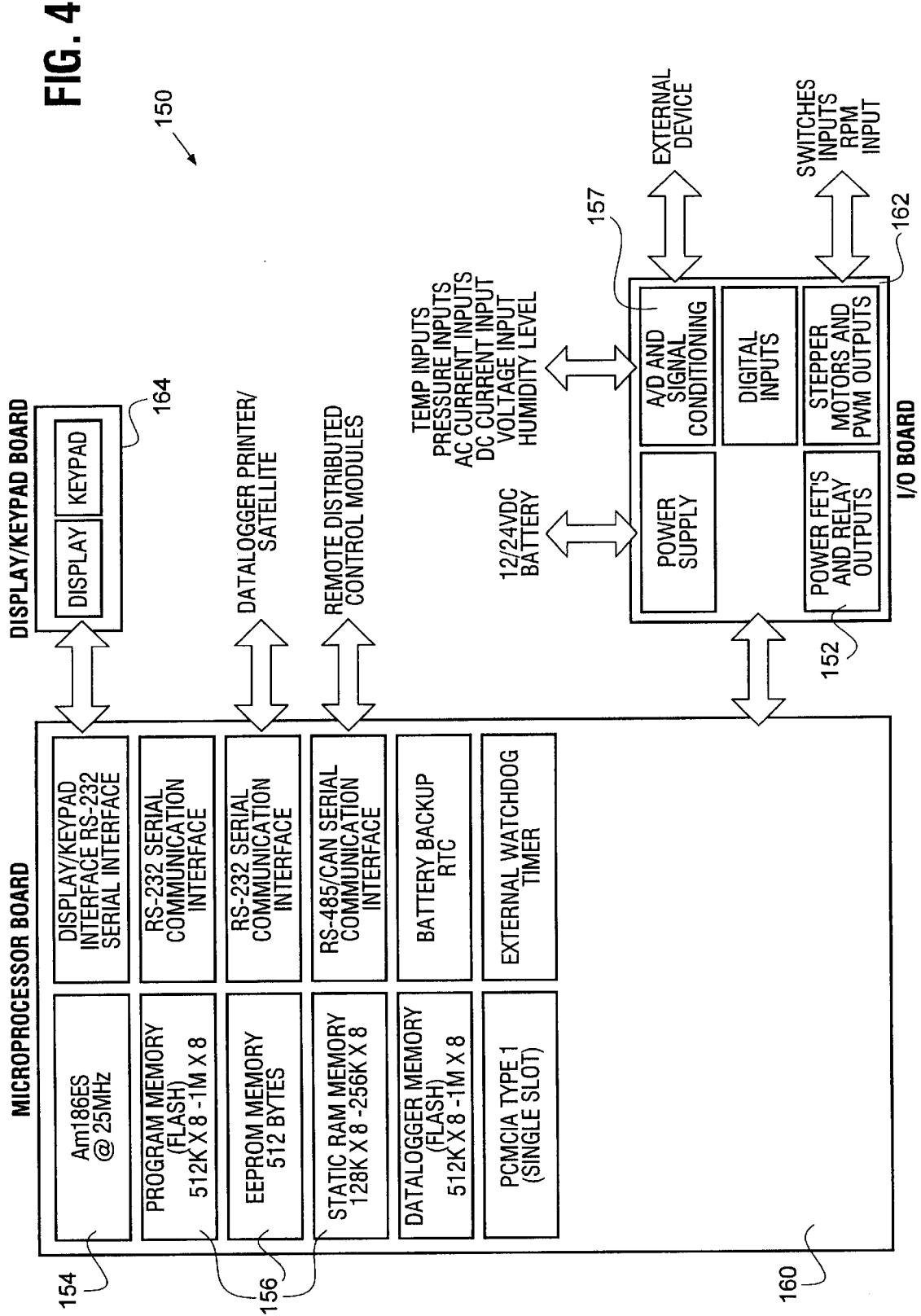

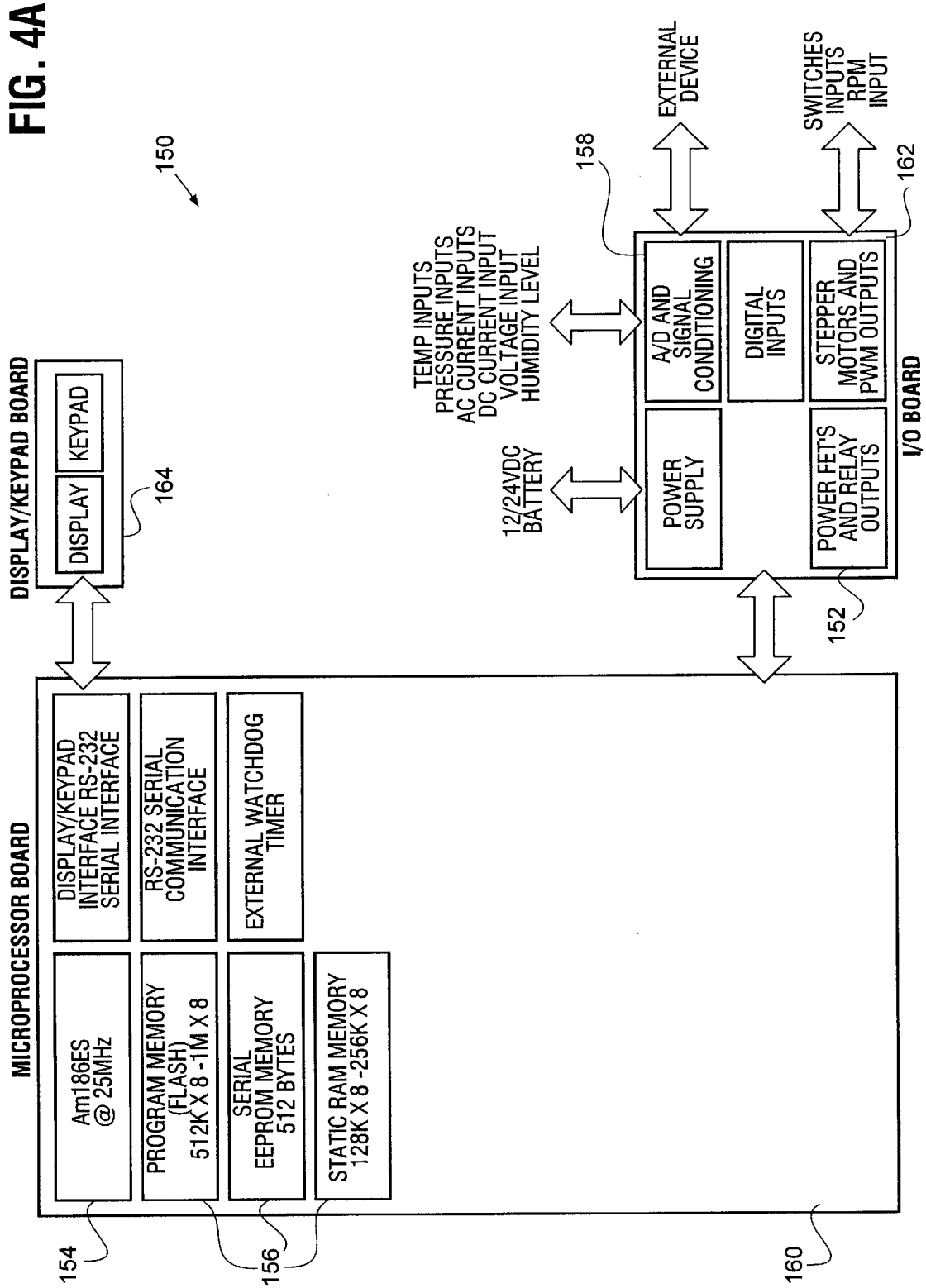

ELECTRONIC EXPANSION VALVE CONTROL SYSTEM

FIELD OF THE INVENTION

The field of the present invention relates to control systems for transport refrigeration systems. More specifically, the present invention is directed towards alternative means for implementing a control system governing the electronic expansion valve (the "EXV"), to precisely maintain the necessary capacity and/or pulldown during a variety of operating and/or ambient conditions.

DESCRIPTION OF THE PRIOR ART

A transport refrigeration system used to control enclosed areas, such as the insulated box used on trucks, trailers, containers, or similar intermodal units, functions by absorbing heat from the enclosed area and releasing heat outside of the box into the environment. A number of transport refrigeration units, including units currently sold by assignee, employ a reciprocating compressor to pressurize refrigerant to enable the removal of heat from the box. The system further includes an evaporator for drawing heat out of the box by drawing or pushing return air across refrigerant containing coils within the evaporator (the refrigerant is typically supplied to the evaporator from a condenser, which in turn receives refrigerant from the compressor). This step vaporizes any remaining liquid refrigerant flowing through the evaporator, which is then drawn through a suction modulation valve (SMV) into the compressor. Thus, in the evaporator, the refrigerant is superheated to a certain extent (superheat being defined as the difference between the temperature of a vapor and the saturation temperature of the same vapor at the same pressure).

Transport refrigeration systems currently employ a variety of controls to manipulate the operating envelope of a reciprocating compressor. As can be shown by U.S. Pat. Nos. 5,626,027 and 5,577,390, both assigned to the assignee of the present invention, compressors can be operated in a multi-stage mode or in single stage modes depending upon operating temperature. Such references further discuss generally the use of suction modulation for capacity control. Also, other current systems meet load requirements of conditioned space by reducing compressor speed, unloading compressor cylinders, and pulsing hot gas into the evaporator. However, currently available commercial designs, including those sold by assignee, do not offer the combination of discharge pressure control, expansion valve control, and superheat level control to maintain a transport refrigeration system within its designed operating envelope.

In addition, a number of problems have arisen within prior commercial transport systems which present needs addressed by the present invention. A serious problem exists in "floodback," i.e., when the system sends liquid refrigerant to the compressor, thus adversely affecting compressor life. In addition, a need exists to maximize pulldown capacity (i.e., the system mode which reduces the temperature of the conditioned space) which creates problems due to the limitations on system power. Another such problem is the occurrence of "nuisance" shutdowns during high ambient temperature conditions due to unacceptable engine coolant temperature, compressor discharge temperature, and/or compressor discharge pressure. Yet another problem that exists during pulldown mode is the inability of the expansion valve, by itself, to control product humidity. Simply controlling power by controlling superheat with the expansion valve will cause low coil temperatures and therefore may result in unacceptable product dehydration. Another product control problem within transport refrigeration systems is "top freezing," a phenomenon which occurs when the refrigeration system operates at or near freezing conditions. The air leaving the evaporator coil in such conditions can be well below freezing and can freeze the top portion of a perishable load unless extraordinary (and costly) insulating steps are taken.

The volume of refrigerant flowing into the evaporator (and thus flowing into the compressor) is controlled by an electronic expansion valve (EXV). Thus, the pressure and temperature of the refrigerant can be controlled via the control of the refrigerant flow rate through the EXV. The applicants have found that, in order to optimize maintenance of the reciprocating compressor of a transport refrigeration system within its design operating envelope, it is desirable to use a controller within the transport refrigeration system which actuates the EXV in response to deviations from a preselected level of superheat (as stored within memory or calculated by the controller), as compared to the superheat level calculated from the evaporator pressure transducer and the evaporator coil temperature sensor. This EXV control, in addition to the selective use of the compressor unloaders and/or engine speed control, is believed to solve the problems mentioned above.

SUMMARY OF THE INVENTION

The control process and system of the present invention uses an evaporator coil temperature sensor (EVAP), an evaporator pressure transducer (EPT), a compressor discharge pressure transducer (CDP), and an ambient temperature sensor (AAT). In a further alternative, the present invention could further include additional sensors to such as an engine water temperature sensor (WTS) and /or a compressor discharge temperature sensor (CDT) to control the shutdown of the transport refrigeration unit.

In essence, the transport refrigeration unit microprocessor (MICRO) uses inputs from the sensors referenced above to control the electronic expansion valve (EXV). Specifically the MICRO reads the EVAP and EPT inputs and calculates or approximates the actual evaporator coil superheat level within the system. The MICRO then compares this calculated superheat level and compares it with a desired superheat level which is stored within memory. The MICRO then generates control signals to close or open the EXV based upon differences between the calculated and desired superheat settings. The various desired superheat levels, in turn, will be set or determined by the MICRO depending upon which mode the transport refrigeration unit is in.

In its "base" setting, the controller monitors and calculates the superheat so as to minimize the level of superheating (short of floodback of liquid refrigerant into the compressor) and thus maximizing the capacity of transport refrigeration system. During pulldown (i.e., the mode in which transport refrigeration units are trying to reduce the temperature of the conditioned space), power is limited—this power limit can be approximated roughly as a constant according to the relationship of the ambient temperature and the compressor discharge pressure. Thus, by controlling the discharge pressure through the adjustment of the EXV, the system can limit compressor discharge pressure such that the maximum power limit is not exceeded. In another variant from the base setting, the cylinders may be loaded based upon box temperature, ambient temperature, or some preselected setpoint. Thus, the unloaders can be used to control the maximum superheat level, thus controlling humidity.

In yet another variant from the base setting, when the operation of the system has caused the temperature of the engine coolant to approach its safety limit, the controller will cause an additional superheat offset to be added to the base level. This system adjustment will effectively reduce the engine load and avoid a high coolant temperature shutdown. Likewise, the control of the EXV can be used to limit compressor discharge pressure, thus avoiding nuisance pressure shutdowns. In addition, the controller can avoid nuisance compressor discharge temperature shutdowns and excessive product dehydration by selectively loading or unloading cylinders in the compressor.

Finally, in another variant from the base setting, the control features of the present invention (specifically, the use of superheat offset) can be used to optimize partial load operation. The use of such a superheat offset reduces capacity and, more importantly, reduces unit fuel consumption.

Accordingly, one object of the present invention is to provide a microprocessor control for the regulation of superheat levels within a transport refrigeration unit.

It is a further object of the invention to provide a microprocessor control for selectively controlling the superheat levels through the EXV of a transport refrigeration unit.

It is yet another object of the present invention to provide a control system for using the EXV tempered by unloading and speed control in order to maintain desired capacity and/or pulldown capability during a variety of operating and/or ambient conditions.

These and other objects, features, and advantages of the present invention will become more apparent in light of the following detailed description of a best mode embodiment thereof, and as illustrated in the accompanying drawings.

BRIEF DESCRIPTION OF THE DRAWINGS

FIG. 4 shows a block schematic of a first preferred embodiment of a controller of the present invention; and FIG. 4a shows a block schematic of a second preferred embodiment of a controller of the present invention.

DETAILED DESCRIPTION OF THE INVENTION

The invention that is the subject of the present application is one of a series of applications dealing with transport refrigeration system design and control, the other copending applications including: "Voltage Control Using Engine Speed"; "Economy Mode For Transport Refrigeration Units"; "Superheat Control for Optimum Capacity Under Power Limitation and Using a Suction Modulation Valve"; "Compressor Operating Envelope Management"; "High Engine Coolant Temperature Control"; "Generator Power Management";and "Electronic Expansion Valve Control Without Pressure Sensor Reading," all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

Figure 1:
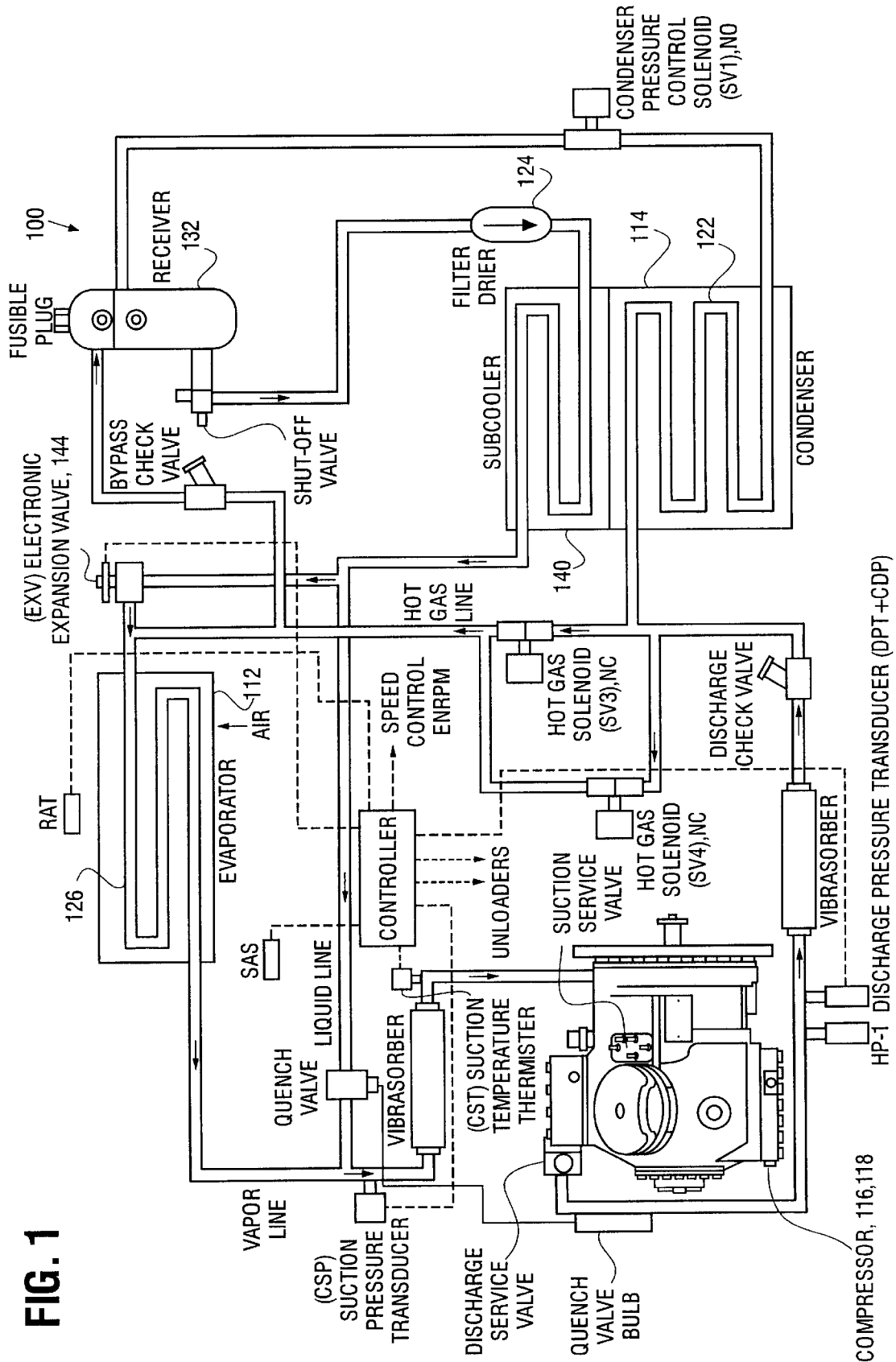
FIG. 1 shows a schematic of a first preferred embodiment of the transport refrigeration system of the present invention.
Figure 2:
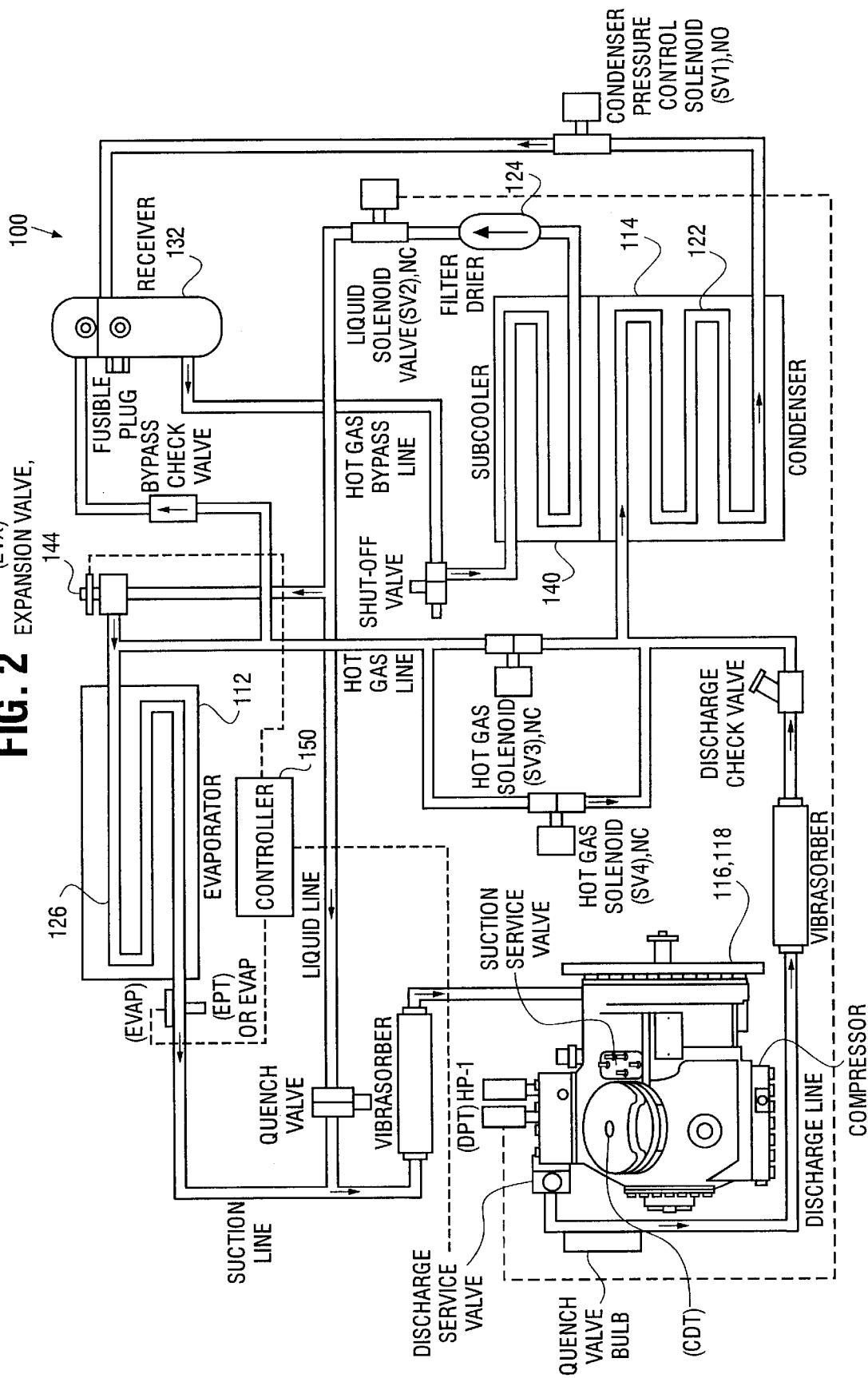
FIG. 2 shows a schematic of a another preferred embodiment of the transport refrigeration system of the present invention.
Figure 3:
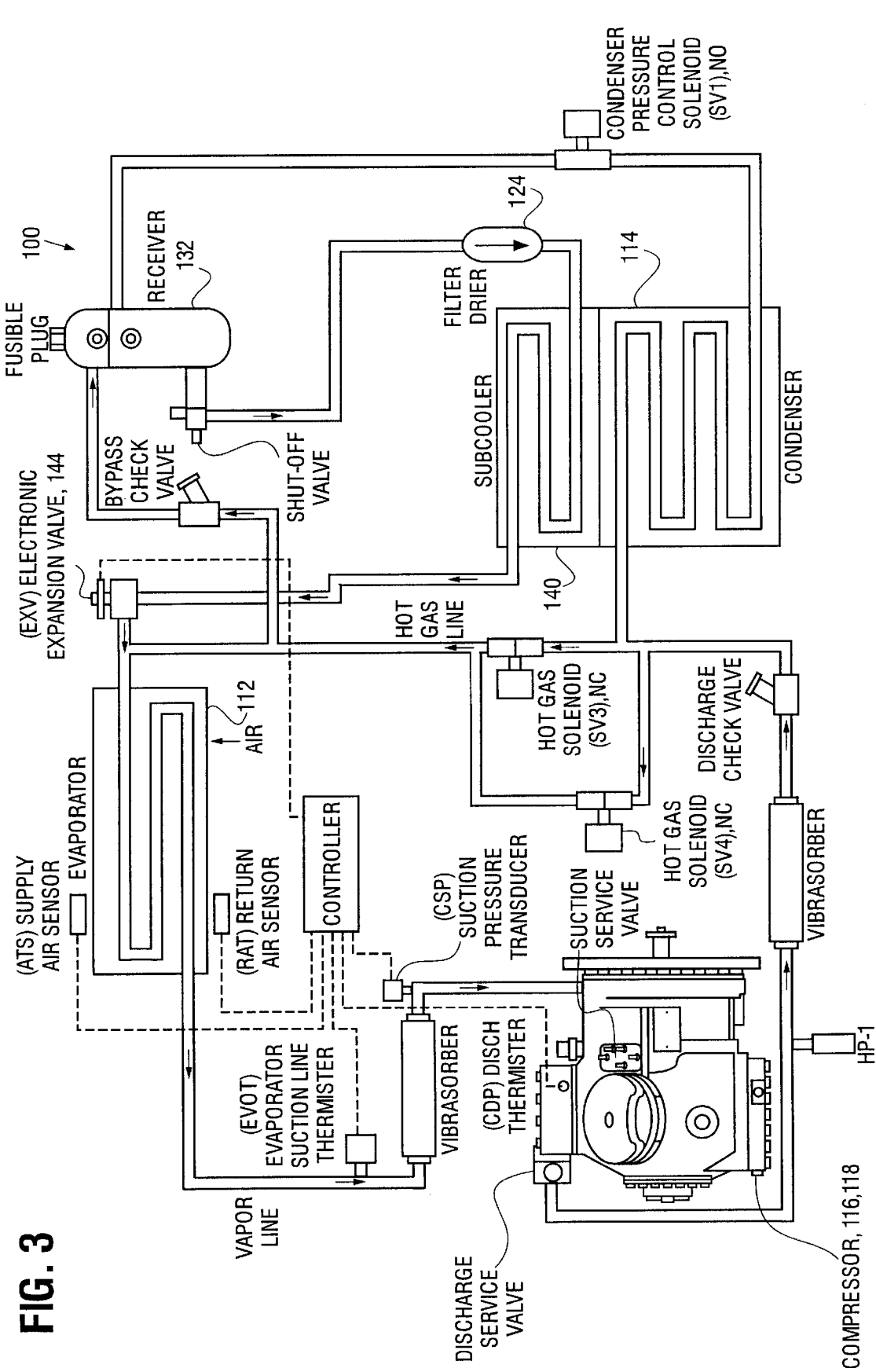
FIG. 3 shows a schematic of yet another preferred embodiment of the transport refrigeration system of the present invention.

FIGS. 1–3 illustrate a schematic representations of the preferred embodiments of the transport refrigeration system 100 of the present invention. The refrigerant (which, in a first preferred embodiment is R404A, and in a second preferred embodiment is R-22) is used to cool the box air (i.e., the air within the container or trailer or truck) of the refrigeration transport system 100. The refrigerant is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions. In the compressor 116, the (preferably vapor state) refrigerant is compressed to a higher temperature and pressure. The refrigerant then moves to the air-cooled condenser 114, which includes a plurality of condenser coil fins and tubes 122, which receives air, typically blown by a condenser fan (not shown). By removing latent heat through this step, the refrigerant condenses to a high pressure/high temperature liquid and flows to a receiver 132 that provides storage for excess liquid refrigerant. From the receiver 132, the refrigerant flows through subcooler unit 140, then to a filter-drier 124 which keeps the refrigerant clean and dry, and then to a heat exchanger (not shown), which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the evaporator 112 through an optional suction modulation valve (or "SMV") (not shown) back into the compressor.

Many of the points in the transport refrigeration system are monitored and controlled by a controller 150. As shown in FIGS. 4 and 4A Controller 150 preferably includes a microprocessor 154 and its associated memory 156. The memory 156 of controller 150 can contain operator or owner preselected, desired values for various operating parameters within the system, including, but not limited to temperature set points for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 157 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as SMV (not shown), EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature (i.e., from air entering the evaporator); the ambient air temperature (AAT or ATS) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVAP or EVOT) sensor, which inputs to microprocessor 154 a variable resistor value according to the outlet refrigerant temperature of evaporator 112; the generator temperature (GENT) sensor, which inputs to microprocessor 154 a resistor value according to the generator temperature; the engine coolant temperature (WTS) sensor, which inputs to microprocessor 154 a variable resistor value according to the engine coolant temperature of engine 118; the compressor suction pressure (CSP) transducer, which inputs to microprocessor 154 a variable voltage according to the compressor suction pressure value of compressor 116; the compressor discharge pressure transducer (CDP or DPT), which inputs to microprocessor 154 a variable voltage according to the compressor discharge pressure value of compressor 116; the evaporator outlet pressure (EVOP or EPT) transducer which inputs to microprocessor 154 a variable voltage according to the evaporator outlet pressure of evaporator 112; the evaporator coil temperature sensor, which inputs to microprocessor 154 variable voltage values corresponding to the temperature of the tube(s) or coil(s) 126 within evaporator 112; the engine oil pressure switch (ENOPS), which inputs to microprocessor 154 an engine oil pressure value from engine 118; direct current and alternating current sensors (CT1 and CT2, respectively), which input to microprocessor 154 variable voltage values corresponding to the current drawn by the system 100 and an engine RPM (ENRPM) transducer, which inputs to microprocessor 154 a variable frequency according to the engine RPM of engine 118.

In the base implementation of the present invention, the microprocessor 154 uses inputs from EPT and EVAP in order to calculate the evaporator coil superheat, using algorithms understood by those of ordinary skill in the art. The microprocessor 154 then compares the calculated superheat value to a preselected, desired superheat value stored in memory 156. The microprocessor 154 will then actuate the EXV depending upon differences between actual and desired superheat in order to maintain the desired superheat setting. If a liquid-suction heat interchanger is used, the suction gas temperature leaving the heat exchanger may be used instead of the EPT. Superheat leaving the heat exchanger is always higher than the superheat at EPT, and thus allows for more latitude of control. Microprocessor 154 will most preferably be preselected to maintain the lowest setting of superheat which will maintain control and still not cause floodback (i.e., escape of liquid refrigerant into the compressor). This value will vary depending upon the capacity and specific configuration of the system, and can be determined through experimentation by those of ordinary skill in the art. This lowest level of superheat will then preferably be used as the "base" setting from which superheat offsets are made in the event of various operating and/or ambient conditions.

In one such condition (i.e., during pulldown mode) the controller 150 monitors and determines whether the required discharge pressure exceeds a predetermined power limit based upon ambient temperature (and possibly pressure). This limit is determined by an algorithm stored in memory 156 (the relationship between compressor discharge pressure, ambient air temperature and maximum available power varies depending upon system components, but can be readily determined by those of skill and programmed into microprocessor 154). If this limit is exceeded, the controller 150 can add an offset to the preselected superheat value stored in memory, which then causes the EXV or expansion valve to close, thus causing a drop in refrigerant flow rate, a drop in compressor suction, and a drop in compressor discharge pressure. A feedback loop is preferably established between the CDP and EXV to maintain the required compressor discharge limit.

Likewise, if the current draw value exceeds the preselected limit value, the microprocessor 154 implements an algorithm which increases the desired superheat level already stored in memory. As a result, microprocessor (through the drive circuit 162) issues a control signal which gradually closes the expansion valve 144 in order to achieve the desired superheat level. This closing of expansion valve 144 limits the mass flow rate of the refrigerant flowing through evaporator 112, and eventually results in a lower flow rate being handled by compressor 116, thus reducing the system power consumption.

In yet another condition requiring deviation from the base setting, the controller 150 selectively actuates the unloaders of the compressor 116 to control the humidity within the conditioned space. If the superheat required to control the CDP is above the maximum allowable superheat levels (which can be programmed into memory), the compressor rear cylinder bank is unloaded. If, after a predetermined period of time (e.g., 20 seconds) the superheat values required to control the CDP value is still above the maximum allowable superheat value, the front cylinder bank is also unloaded. This same type of control of cylinder loading and unloading can likewise be used to control and limit CDT levels to prevent nuisance shutdowns.

The system and process of the present invention further includes controls for avoiding unacceptable engine coolant temperatures. If the WTS value input to the controller 150 is above the maximum temperature allowed (as preferably programmed into memory 156) for more than a predetermined period of time (e.g., 20 seconds), then the controller 150 adds an offset to the preselected superheat value stored in memory 156, which results in actuating the EXV or expansion valve 144. This result effectively reduces engine load and thus prevents system shutdown due to high coolant temperature.

Still another variant from the base EXV/superheat setting could occur in the event of "top freezing" conditions. If the supply air sensor (SAS) temperature dropped below a predetermined limit stored in memory (either by user selection or default preprogramming), the controller 150 would add an offset to the preselected superheat value stored in memory 156, thus resulting in a reduction of capacity and an increase in supply air temperature to above the predetermined limit. Likewise, this type of control could be used in an alternative embodiment to employ inputs from the RAT as well as SAS to maximize capacity (i.e., by adjusting the EXV opening in order to maximize the differential between SAS and RAT), subject to override by the system limits and controls of the compressor discharge pressure DPT/CDP described above.

It will be appreciated by those skilled in the art that various changes, additions, omissions, and modifications can be made to the illustrated embodiments without departing from the spirit of the present invention. For instance, the values stored in memory (whether related to superheat, CDP, CDT, WTS or other inputs) could be stored in a map, or they could be calculated or stored in an algorithm used by processor 154 of controller 150. Likewise, the advantages of the present invention apply equally to non-reciprocating type compressors (e.g. screw compressors). All such modifications and changes are intended to be covered by the following claims.

We claim:

1. A process for optimizing capacity in a refrigeration unit under controlled, power limitation conditions, said process comprising the steps of:
   i monitoring the compressor discharge pressure and ambient air temperature of the refrigeration unit;
   ii determining a desired compressor discharge pressure limit;
   iii comparing said compressor discharge pressure to said desired compressor discharge pressure limit; and
   iv selectively increasing a desired superheat setting when said compressor discharge pressure exceeds said compressor pressure discharge limit, thereby restricting an electronic expansion valve so as to decrease a refrigerant mass flow within the refrigeration unit and to decrease power consumption of said refrigeration unit.

2. The process of claim 1 comprising the further steps of:
   v further monitoring the compressor discharge pressure of the refrigeration unit;
   vi comparing said compressor discharge pressure to said compressor discharge pressure limit; and
   vii selectively decreasing the desired superheat setting to its original value when said compressor discharge pressure falls below said compressor discharge pressure limit.

3. The process of claim 1 wherein a suction modulation valve of said refrigeration system is maintained at a constant opening throughout the steps of the process.

4. The process of claim 1, wherein said refrigeration unit is a transport refrigeration unit.

5. The process of claim 1 wherein the step of selectively increasing a desired superheat setting is limited by an algorithm in a controller, said algorithm being defined as a function of the compressor discharge temperature and the ambient air temperature.

6. A process for preventing unnecessary shutdowns in a transport refrigeration unit having an engine load, said process comprising the steps of:
   i monitoring the engine coolant temperature of the transport refrigeration unit;
   ii comparing said engine coolant temperature to a preselected, desired engine coolant temperature limit; and
   iii selectively increasing a desired superheat setting when said engine coolant temperature exceeds said engine coolant temperature limit, thereby restricting an electronic expansion valve so as to decrease a refrigerant mass flow within the refrigeration unit and to decrease the engine load of said refrigeration unit.

7. A process for preventing unnecessary shutdowns in a transport refrigeration unit, said process comprising the steps of:
   i monitoring the compressor discharge temperature of the transport refrigeration unit;
   ii comparing said compressor discharge temperature to a desired, preselected compressor discharge temperature limit; and
   iii selectively actuating a compressor unloader when said compressor discharge temperature exceeds said compressor discharge temperature limit, thereby restricting a refrigerant mass flow of the refrigeration unit and decreasing said compressor discharge temperature of said transport refrigeration unit.

8. A process for preventing unnecessary shutdowns in a transport refrigeration unit, said process comprising the steps of:
   i monitoring the compressor discharge pressure of the transport refrigeration unit;
   ii comparing said compressor discharge pressure to a desired, preselected compressor discharge pressure limit; and
   iii selectively actuating a compressor unloader when said compressor discharge pressure exceeds said compressor discharge pressure limit, thereby restricting a refrigerant mass flow within the refrigeration unit and decreasing the compressor discharge pressure of said transport refrigeration unit.

9. A process for avoiding top freezing conditions in a transport refrigeration unit, said process comprising the steps of:
   i monitoring the supply air temperature of the transport refrigeration unit;
   ii comparing said supply air temperature to a desired supply air temperature limit; and
   iii selectively increasing a desired superheat setting when said supply air temperature falls below said supply air temperature limit, thereby restricting an electronic expansion valve so as to decrease a refrigerant mass flow of the refrigeration unit and to decrease capacity of said transport refrigeration unit.

* * * * *